United States Patent
Wu et al.

(10) Patent No.: US 10,581,564 B1
(45) Date of Patent: Mar. 3, 2020

(54) PRE-PLACED MESSAGES

(71) Applicant: Architecture Technology Corporation, Eden Prairie, MN (US)

(72) Inventors: John Wu, Eden Prairie, MN (US); Ranga S. Ramanujan, Medina, MN (US)

(*) Notice: Subject to any disclaimer, the term of this patent is extended or adjusted under 35 U.S.C. 154(b) by 75 days.

(21) Appl. No.: 15/926,978

(22) Filed: Mar. 20, 2018

(51) Int. Cl.
| | |
|---|---|
| *H04L 1/18* | (2006.01) |
| *H04L 29/08* | (2006.01) |
| *H04L 12/823* | (2013.01) |
| *B64C 39/02* | (2006.01) |
| *G08G 5/00* | (2006.01) |

(52) U.S. Cl.
CPC ............ *H04L 1/187* (2013.01); *B64C 39/024* (2013.01); *G08G 5/003* (2013.01); *H04L 1/189* (2013.01); *H04L 47/32* (2013.01); *H04L 67/12* (2013.01)

(58) Field of Classification Search
CPC ......... H04L 1/187; H04L 67/12; H04L 1/189; H04L 47/32; G08G 5/003; B64C 39/024
See application file for complete search history.

(56) References Cited

U.S. PATENT DOCUMENTS

| | | | | |
|---|---|---|---|---|
| 2009/0276303 A1* | 11/2009 | Singhal | .................. | G06Q 30/02 705/14.11 |
| 2010/0293033 A1* | 11/2010 | Hall | ....................... | G06Q 30/02 705/14.53 |
| 2019/0045348 A1 | 2/2019 | Li et al. | | |
| 2019/0103029 A1 | 4/2019 | Hernandez et al. | | |
| 2019/0129937 A1* | 5/2019 | Argo | .................... | B64C 39/024 |
| 2019/0223237 A1 | 7/2019 | Hong | | |

OTHER PUBLICATIONS

John W. Nicholson, Autonomous Optimal Rendezvous of Underwater Vehicles, Sep. 2004, Naval Postgraduate School, [retrieved on Dec. 16, 2019]. Retrieved from the Internet URL: <https://apps.dtic.mil/dtic/tr/fulltext/u2/a427262.pdf> (Year: 2004).*

(Continued)

*Primary Examiner* — Omar J Ghowrwal
(74) *Attorney, Agent, or Firm* — Carlson, Caspers, Vandenburgh & Lindquist, P.A.

(57) ABSTRACT

Embodiments for a communication enhancement module for a first communicating device are disclosed. The communication enhancement module includes instructions thereon. The instructions cause the communication enhancement module to receive an activation message from a data terminal of the first communicating device. The activation message is sent from a communication enhancement module of a second communicating device. In response to receiving the activation message, a set of pre-placed messages is identified to which the activation message is assigned. A set of messages is generated corresponding to the set of pre-placed messages. Each message in the set of messages conforms to a communication protocol used by the second communicating device for messages sent to the first communicating device. The set of messages indicate that the set of messages originated at the second communicating device. The set of messages is sent to a main processing module of the first communicating device.

14 Claims, 5 Drawing Sheets

(56) References Cited

OTHER PUBLICATIONS

"Stanag 4586 (Edition 3)", NATO Standardization Agency, pp. 1-509, Nov. 9, 2012.
Border, et al., "Performance Enhancing Proxies Intended to Mitigate Link-Related Degradations", Network Working Group, pp. 1-45, Jun. 2001, USA.
U.S. Patent and Trademark Office, "Notice of Allowance", U.S. Appl. No. 15/916,000, dated Sep. 13, 2019, pp. 1-10.

* cited by examiner

PRE-PLACED MESSAGES

BACKGROUND

Communicating messages over a wireless link that has severe bandwidth degradation can be difficult. While some messages can wait until the degraded conditions subside, other messages are desirably communicated as soon as possible. One such message is a control message for an unmanned vehicle. The control message may be a command for a particular movement of the unmanned vehicle, or a command for action by a payload device on the unmanned vehicle. In any case, there will be many situations in which it is desirable for the control message to be communicated to the unmanned vehicle in a timely manner, so that the desired action can be performed at the desired time.

Sometimes, performing a desired action with an unmanned vehicle requires a series of control messages to be sent. Each control message in the series commands the unmanned vehicle to perform a small portion of the overall action. The combined effect of all the small portions is the overall action that is desired. Unfortunately, if a wireless link to the unmanned vehicle is severely degraded, one or more of the command messages in the sequence may not be properly received by the unmanned vehicle in a timely manner. This can result in the unmanned vehicle receiving incomplete instructions and, potentially, taking improper action or no action as a result.

Unmanned Aerial Vehicles (UAVs) utilizing the communication standard STANAG 4586 are one type of unmanned vehicle in which a series of control messages are commonly sent to effectuate an overall action. STANAG 4586 allows multiple UAVs to interoperate with a single UAV control system (UCS). Because of the interoperability advantages of STANAG 4586, many current and future UAVs are/will be compatible with the standard. The wireless links used with STANAG 4586, however, can suffer from severe bandwidth degradation in certain environments due to weather, geography, and/or enemy jamming. Because of this, there is a need to improve the robustness and reliability of control messages for UAVs using the STANAG 4568 standard.

BRIEF DESCRIPTION

Embodiments for a communication enhancement module for a first communicating device are disclosed. The communication enhancement module includes a computer readable medium having instructions thereon. The instructions, when executed by one or more processing devices, cause the one or more processing devices to receive an activation message from a data terminal of the first communicating device. The activation message is sent from a communication enhancement module of a second communicating device. In response to receiving the activation message, the instructions cause the one or more processing devices to identify a set of pre-placed messages stored on the computer readable medium to which the activation message is assigned. A set of messages is generated corresponding to the set of pre-placed messages. Each message in the set of messages conforms to a communication protocol used by the second communicating device for messages sent to the first communicating device. The set of messages indicate that the set of messages originated at the second communicating device. The set of messages is sent to a main processing module of the first communicating device.

Embodiments for a method for enhancing communication are also provided. The method includes receiving, at a first communication enhancement module, an activation message from a data terminal of a first communicating device. The activation message is sent from a second communication enhancement module of a second communicating device. In response to receiving the activation message, a set of pre-placed messages to which the activation message is assigned are identified at the first communication enhancement module. A set of messages corresponding to the set of pre-placed message are generated at the first communication enhancement module. Each message in the set of messages conforms to a communication protocol used by the second communicating device for messages sent to the first communicating device. The set of messages indicate that the set of messages originated at the second communicating device. The set of messages are sent from the first communication enhancement module to a main processing module of the first communicating device sending.

Embodiments for a method for enhancing communication are also provided. The method includes comparing, at a communication enhancement module in a first communicating device, a plurality of outgoing messages generated by a main processing module of the first communicating device with one or more sets of pre-placed messages. The plurality of outgoing messages generated by the main processing module are for transmission to another communicating device. If a first set of outgoing messages in the plurality of outgoing messages matches a first set of pre-placed messages of the one or more sets of pre-placed messages and the first set of outgoing messages is destined for a second communicating device in which a copy of the first set of pre-placed messages is stored, an activation message is generated at the communication enhancement module, wherein the activation message corresponds to the first set of pre-placed messages. The activation message is sent to a data terminal of the first communicating device, wherein the data terminal transmits the activation message to the second communicating device. The first set of outgoing messages is discarded without sending the first set of outgoing messages to the data terminal, such that the set of outgoing messages are not transmitted to the second communicating device. If a message in the plurality of outgoing messages is not part of a set of messages that matches a set of pre-placed messages, the message is sent to the data terminal of the first communicating device for transmission.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

The subject matter described herein provides for a communication enhancement module that can be added to a communicating device to improve the robustness and reliability of communications in the face of degraded bandwidth wireless links. The communication enhancement module is an add-in that can be retrofit into commercial off the shelf (COTS) devices to enhance the communications of those devices. The communication enhancement module can be added as a bump-in-the-wire or bump-in-the-stack module to the communicating device.

The communication enhancement module is configured to cooperate with one or more other communication enhancement modules in other communicating devices to utilize pre-placed messages in the other communication enhancement module(s) to enhance communication between two communicating devices. The pre-placed messages are messages that are to-be-received by a communicating device and are stored in the communication enhancement module of that communicating device. Instead of transmitting the messages to that communicating device, the messages are pre-placed in the device's communication enhancement module and activated at the desired time. The communication enhancement modules automatically utilize the pre-placed messages in real-time, so that their use can be transparent to the communicating devices. Using pre-placed messages reduces the bandwidth requirements on the wireless link because a single message can be sent to activate a plurality of pre-placed messages instead of transmitting and receiving each of the pre-placed messages individually.

The communicating device can be any device that communicates with another device, and in which it is likely that a known set of messages will be communicated to that device. Example communicating devices include mobile phones, wearable devices, smart home devices, robots, or unmanned vehicles. Example unmanned vehicles include an unmanned aerial vehicle (UAV), an unmanned land vehicle, or an unmanned water vehicle.

Figure 1:
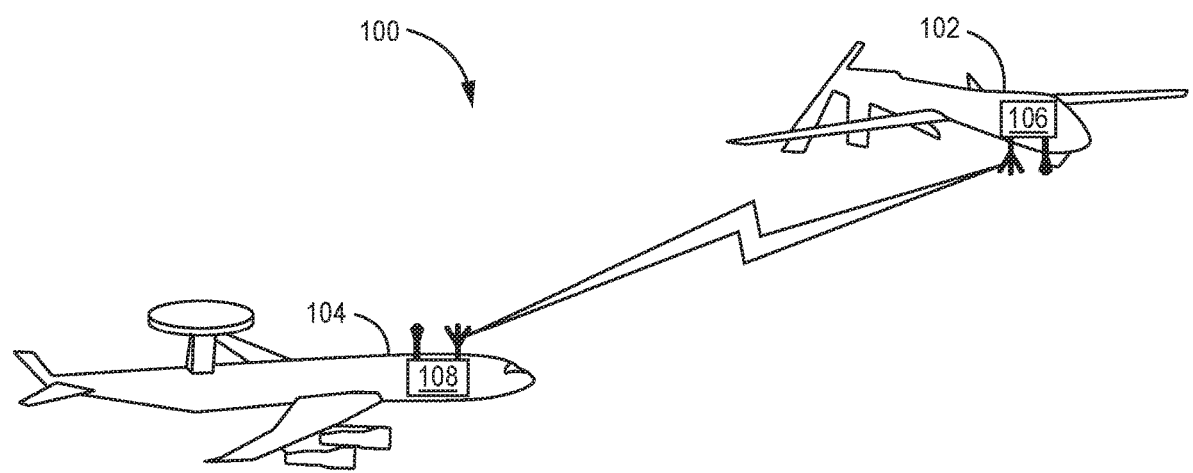
FIG. 1 is a block diagram of an example system including a multi-UAV control system (MUCS) and a UAV, which each have communication enhancement modules therein.

FIG. 1 is a bock diagram of an example system 100 for enhancing communication for an unmanned aerial vehicle (UAV) 102. The UAV 102 is communicatively coupled to a multi-UAV control system (MUCS) 104. In this example, the UAV 102 is communicatively coupled to the MUCS 104 via a point-to-point wireless link 110. In an example, the point-to-point wireless link 110 between the UAV 102 and the MUCS 104 is a command and control (C2) and/or payload data link for the UAV 102. In other examples, the UAV 102 can be coupled to the MUCS 104 via a multi-link route, such as described in co-pending U.S. patent application Ser. No. 15/916,000, titled "UAV COMMUNICATION ENHANCEMENT MODULE", which is hereby incorporated herein by reference. Although only a single UAV 102 is shown as coupled to the MUCS 104, multiple UAVs can be controlled concurrently by the MUCS 104. Each of such multiple UAVs can have a communication enhancement module 102 installed therein or only a subset of such multiple UAVs can include a communication enhancement module 102. UAVs without a communication enhancement module 102 may not benefit from the communication enhancements provided thereby.

The MUCS 104 controls the UAV 102 by sending STANAG 4586 messages to the UAV 102. The UAV 102 receives the STANAG 4586 messages and takes action as directed by the commands in the STANAG 4586 messages. The UAV 102 can also send STANAG 4586 messages to the MUCS 104 to communicate information back to the MUCS 104. A STANAG 4586 message is a message that conforms to a STANAG 4586 standard, such as edition 3 of the STANAG 4586 standard published on Nov. 9, 2012 by the NATO Standardization Agency, which is hereby incorporated herein by reference. For example, a STANAG 4586 message can be any of the Generic (Common) DLI messages in section 4 of Appendix 1 of Annex B of STANAG 4586.

The UAV 102 and the MUCS 104 each include a respective communication enhancement module 106, 108. Each communication enhancement module 106, 108 is a software tool or hardware-and-software appliance that interacts with other components of the UAV 102 or MUCS 104 to provide enhanced communication capabilities for the UAV 102 or MUCS 104. The communication enhancement module 106, 108 interacts with its UAV 102 or MUCS 104 using the STANAG 4586 protocol, enabling the communication enhancement module 106, 108 to be added to any new or existing STANAG 4586 compliant UAV or MUCS. Accordingly, the communication enhancement module is configured to be added to commercial off the shelf (COTS) UAV or MUCS infrastructure to provide enhanced communication capabilities thereto.

Although the communication enhancement modules 106, 108 are shown and described herein as being used with a UAV 102 and MUCS 104, the communication enhancement modules 106, 108, can be used with any communicating devices in which it is likely that one or more known sets of messages will be communicated between the devices.

The communication enhancement module 106, 108 included in its respective UAV 102 or MUCS 104 can be physically disposed in or on the body of their UAV 102 or MUCS 104, so that the communication enhancement module 106, 108 travels with its UAV 102 or MUCS 104 as/if it moves around. The MUCS 104 and its corresponding communication enhancement module 108 can be disposed at any appropriate location including on the ground or in an aircraft. All components of the MUCS 104 can be disposed at a common location or the components of the MUCS 104 can be distributed across multiple locations.

Figure 2:
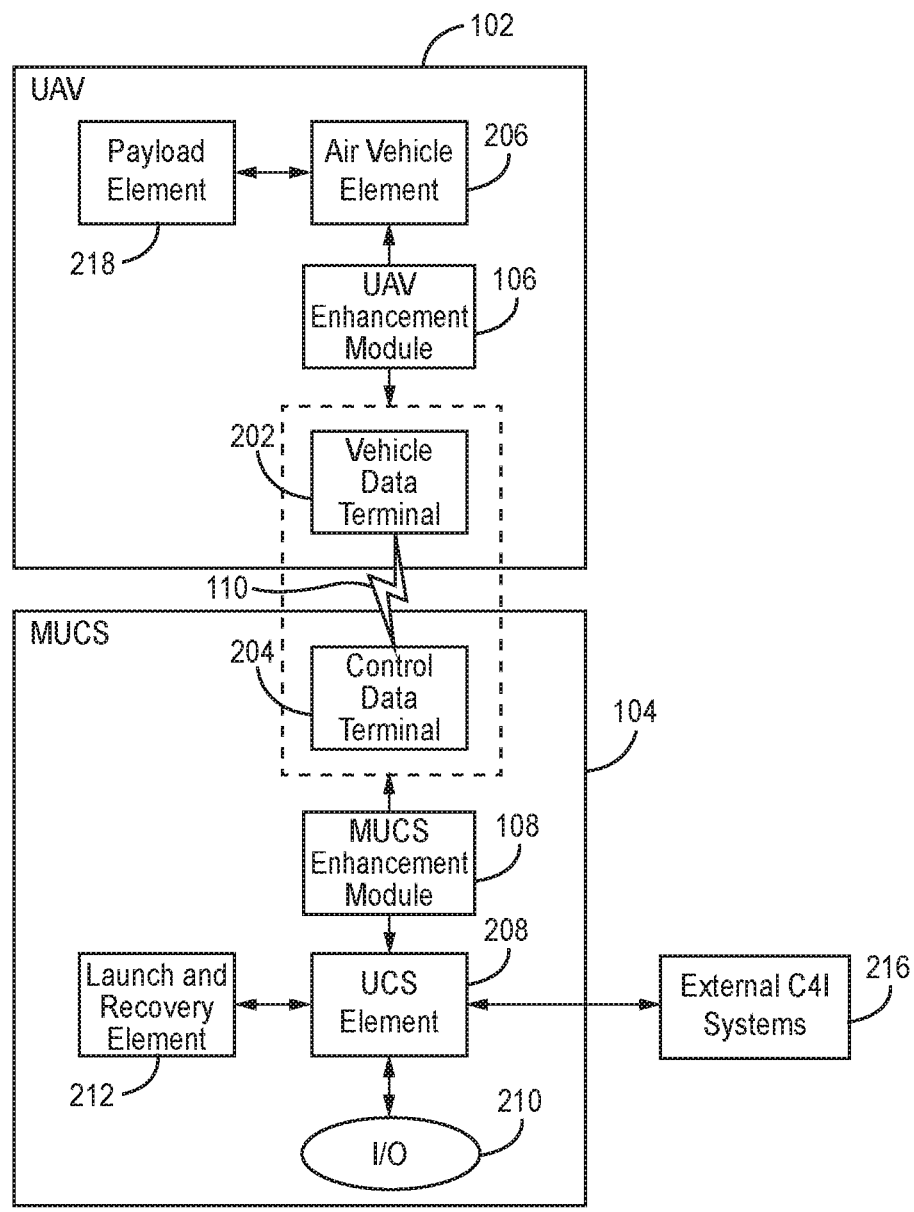
FIG. 2 is a block diagram showing example components of the MUCS and the UAV of the system of FIG. 1.

FIG. 2 is a block diagram of system 100 showing components of the UAV 102 and the MUCS 104. The communication enhancement modules 106, 108, coordinate with one another to provide the communication enhancements described herein. The UAV 102 and the MUCS 104 each include one or more data terminals 202, 204 for generating the physical layer for the wireless link 110. The data terminals 202, 204 can generate and receive the respective wireless signal to/from their corresponding UAV/MUCS 102, 104. The wireless signal for the communication link 110 can have any suitable physical layer protocol in any suitable frequency range, such as those commonly used with STANAG 4586. Multiple data terminals 202, 204 can be included in the UAV 102 or MUCS 104 for wireless communication over multiple frequencies or communication protocols.

The UAV 102 and the MUCS 104 each also include a main processing module 206, 208 (e.g., air vehicle element, UCS element). The main processing module 206, 208 generates and receives STANAG 4586 messages for communication over the wireless link 110. The main processing module 206, 208 can also perform general purpose processing for the UAV 102 or MUCS 104. For example, the main processing module 208 in the MUCS 104 can operate a UAV control system for the UAV 102 and can generate commands to-be-sent to the UAV 102 to effectuate such controls. The main processing module 206 in the UAV 102 can include a vehicle specific module that performs the avionic processing for the UAV 102 and takes action in response to commands received from the MUCS 104. The UAV 102 and MUCS 104 can also include other elements that interact with the main processing modules 206, 208 to perform tasks as desired by the UAV 102 and MUCS 104. These other elements can include one or more input/output (I/O) devices 210 at the MUCS 104 for receiving input from and providing output to a user. The I/O device(s) 210 can include any suitable I/O device such as a keyboard, display screen, touchscreen, mouse, touchpad, microphone, speaker, etc. The MUCS 104 can also include a launch and recovery element 212 for generating commands for directing the UAV 102 to launch and be recovered. The main processing module 208 of the MUCS 104 can also send and receive information to/from externally coupled systems, such as an external C41 system 216. The UAV 102 can include one or more payload elements 218 which perform tasks for the UAV 102, such as a video camera for capturing video.

The communication enhancement module 106, 108 of the UAV 102 and the MUCS 104 is disposed in the communication path between the one or more data terminals 202, 204 and the main processing module 206, 208 of that UAV 102 or MUCS 104. Thus, the communication enhancement module 106, 108 is coupled to the one or more data terminals 202, 204 and to the main processing module 206, 208 of its UAV 102 or MUCS 104. If the UAV 102 or the MUCS 104 has multiple data terminals 202, 204, the communication enhancement module 106, 108 of the UAV 102 or the MUCS 104 can be coupled to each of the multiple data terminals 202, 204 to provide the communication enhancements for all the corresponding communication links, or the communication enhancement module 106, 108 can be coupled to a subset of the multiple data terminals 202, 204.

In the outbound direction, each main processing module 206, 208 generates STANAG 4586 messages for sending to the UAV 102 or MUCS 104 on the other end of the communication link 110. The main processing modules 206, 208 can generate the STANAG 4586 messages in accordance with STANAG 4586 based on any suitable information. For example, the main processing module 208 in the MUCS 104 can receive inputs from the I/O device 210, wherein the inputs correspond to commands for the UAV 102. In response to receiving the inputs, the main processing module 208 can generate STANAG 4586 messages corresponding to the commands for the UAV 102. As another example, the main processing module 206 in the UAV 102 can receive information from the payload element 218 and generate STANAG 4586 messages corresponding to the information, to transmit the information to the MUCS 104.

In the inbound direction, each main processing module 206, 208 can receive STANAG 4586 messages and take appropriate action in response to the STANAG 4586 message. For example, the main processing module 208 in the MUCS 104 can receive a STANAG 4586 message from the UAV 102, wherein the STANAG 4586 message contains information that was obtained by the payload element 218 of the UAV 102. The main processing module 208 of the MUCS 104 can receive this STANAG 4586 message, decode the message, and provide information to the I/O device 210 for the I/O device 210 to provide as output to a user. The main processing module 206 in the UAV 102 can receive a STANAG 4586 message from the MUCS 104, wherein the STANAG 4586 message contains a command for an action to be taken by the payload element 218. The main processing module 206 of the UAV 102 can receive this STANAG 4586 message, decode the message, and command the payload element 218 in accordance with the STANAG 4586 message.

Each communication enhancement module 106, 108 can be coupled between the main processing module 206, 208 and the data terminal 202, 204 of its UAV 102 or MUCS 104. The communication enhancement module 106, 108 can interact with the main processing module 206, 208 of its UAV 102 or MUCS 104 to provide the communication enhancements for the UAV 102 or MUCS 104. The communication enhancement modules 106, 108 are disposed on each end of the wireless link 110, and the communication enhancement modules 106, 108 cooperate to intercept STANAG 4586 messages to-be-sent over the wireless link 110 in order to provide the enhanced communication features.

Because the communication enhancement modules 106, 108 are coupled between the main processing module 206, 208 and their corresponding data terminal 202, 204, the communication enhancement modules 106, 108 can intercept the STANAG 4586 messages from the main processing modules 206, 208 before the messages are sent over the communication link 110. By intercepting the STANAG 4586 messages before the messages are sent, the communication enhancement modules 106, 108 can modify the manner in which the messages are sent to perform the communication enhancement. Additionally, disposing the communication enhancement modules 106, 108 in this location allows them to re-create the original messages and pass the re-created messages to their corresponding main processing module 206, 208. Accordingly, the position in which the communication enhancement modules 106, 108 are coupled enables the communication enhancement to be provided in a manner transparent to the main processing modules 206, 208.

Additionally, by interacting with the main processing modules 206, 208 using the communication protocol that the main processing modules 206, 208 natively support (e.g., STANAG 4586), the communication enhancement modules 106, 108 can be added to any COTS communicating device that can send and receive messages using that communication protocol. Moreover, the components of the communicating device to which the communication enhancement module 106, 108 is added do not require significant changes for the communication enhancements. Instead, the main processing unit 206, 208 of the communicating device (e.g., UAV 102 or MUCS 104) can input and output messages in the normal manner, merely adjusting where the messages are passed to and received from. Instead of passing messages to the data terminal 202, 204, the main processing unit 206, 208 passes messages to the communication enhancement module 106, 108, which can then modify the manner in which the messages are transmitted as described below. Additionally, instead of receiving messages at the main processing unit 206, 208 from the data terminal 202, 204, the messages received at the data terminal 202, 204 are passed to the communication enhancement module 106, 108, where the original messages can be re-created and passed to the main processing module 206, 208. Accordingly, the communication enhancement modules 106, 108 can easily be added to new or existing communicating devices that use a common communication protocol.

Although the communication enhancement modules 106, 108 are described herein as interacting with the main processing modules 206, 208 using STANAG 4586 messages, in other examples where the communication enhancement modules 106, 108 are installed in other communicating devices that do not use STANAG 4586, the communication enhancement modules 106, 108 can interact with the main processing modules 206, 208 using messages that conform with the communication protocol used by the communicating devices. Thus, communication protocols other than STANAG 4586 can be used.

Figure 3:
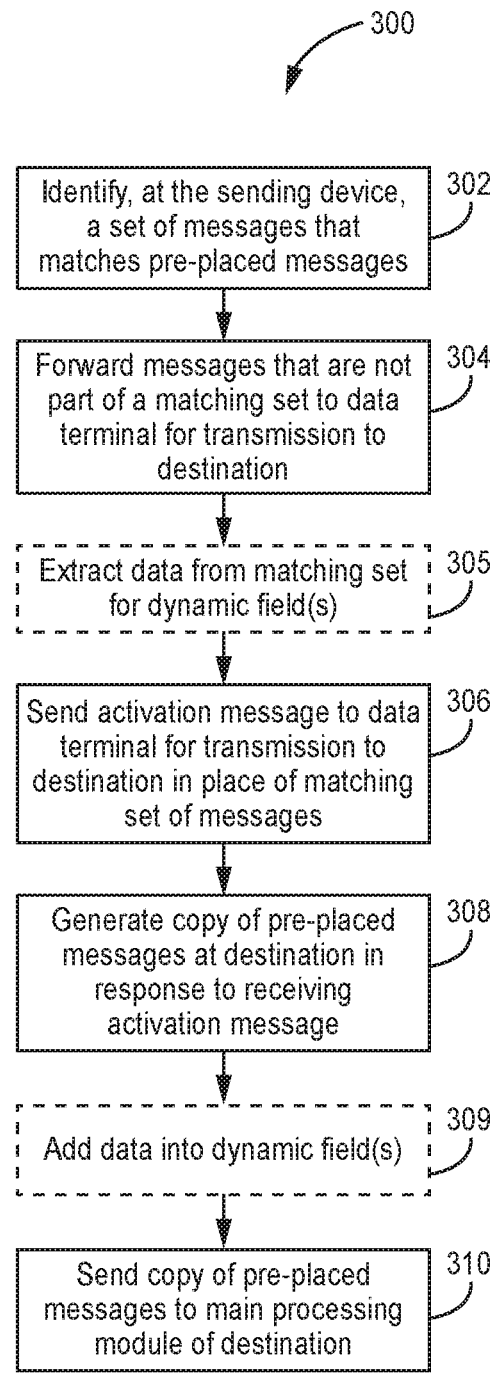
FIG. 3 is a flow diagram of an example method of enhancing communication for the MUCS and UAV using the communication enhancement modules of FIG. 2.

FIG. 3 is a flow diagram of an example method 300 of enhancing communication with the communication enhancement modules 106, 108. The enhanced communication features include reducing the susceptibility of the communication path between the MUCS 104 and the UAV 102 to severe bandwidth degradation on the wireless link 110. The communication enhancement modules 106, 108 provide this enhancement by utilizing pre-placed messages in the UAV 102. The pre-placed messages are stored in a computer readable medium of the communication enhancement module 106 on the UAV 102. The pre-placed messages include at least a first set of pre-placed messages to-be-sent from the MUCS 104 to the UAV 102. The first set of pre-placed messages can be a plurality of messages that collectively cause the UAV 102 to perform one or more desired actions. The desired action(s) can be any suitable action, such as a physical maneuver, route change, or payload action.

Method 300 begins with the communication enhancement module 108 of the MUCS 104 identifying a matching set of messages to the first set of pre-placed messages (block 302). The communication enhancement module 108 identifies a matching set of messages by comparing outgoing messages with a representation (e.g., copy) of the first set of pre-placed messages. The main processing module 208 of the MUCS 108 can generate the outgoing messages for transmission to the first UAV 102 in the normal manner. Once generated, the outgoing messages are sent from the main processing module 208 to the communication enhancement module 108. The communication enhancement module 108 then compares the outgoing messages to a representation (e.g., copy) of the first set of pre-placed messages to determine if there is a set of messages in the outgoing messages that matches the first set of pre-placed messages.

In order to identify a set of messages that matches (also referred to herein as a "matching set of messages") the first set of pre-placed messages, the communication enhancement module 108 can hold (e.g., buffer) outgoing messages from the main processing module 208 to allow the communication enhancement module 108 to determine if any of the outgoing messages match the first set of pre-placed messages. In order to compare outgoing messages as a set to the first set of pre-placed messages, the communication enhancement module 108 holds some or all outgoing messages for a period of time to include future outgoing messages in a set with current outgoing messages. The communication enhancement module 108 can hold each outgoing message without sending the message to the data terminal 204, until it has been determined whether or not the outgoing message is part of a matching set of messages.

If the communication enhancement module 108 determines that a message is NOT part of a matching set of messages, the communication enhancement module 108 can forward the message to the data terminal 204 for transmission to the UAV 102 (block 304). If the communication enhancement module 108 determines that a message IS part of a matching set of messages, the communication enhancement module 108 does not forward the message to the data terminal. Instead, the communication enhancement module 108 takes further action as described in more detail below.

The set of outgoing messages compared with a set of pre-placed messages can consist only of outgoing messages that are destined for a communicating device in which the first set of pre-placed message is stored. That is, for comparison with the first set of pre-placed messages, only outgoing messages destined for the UAV 102 are compared with the first set of pre-placed messages if the first set of pre-placed messages is stored only in the communication enhancement module 106 of the UAV 102. Outgoing messages destined for a communication device that does not have a given set of pre-placed messages therein, are not considered part of a matching set of messages to that given set of pre-placed messages.

If the main processing module 208 of the MUCS 104 is generating messages that are destined for other communicating devices (e.g., other UAVs) along with messages destined for the UAV 102, the communication enhancement module 108 can separate the messages based on where they are destined and compare outgoing messages for each destination separately. Thus, the messages destined for the UAV 102 are compared with the first set of pre-placed messages separately from messages for other UAVs.

In an example, a set of messages is considered to match the first set of pre-placed messages if (e.g., only if) the set is a contiguous set of messages having a 1-to-1 correspondence with the first set of pre-placed messages. In a first implementation of this example, the contiguous set of messages is considered to match if (e.g., only if) the contiguous set also is in the same order as the first set of pre-placed messages. In a second implementation of this example, the contiguous set of messages is considered to match regardless of the order of the messages.

In an example, a window can be used to compare messages received by the communication enhancement module 108 with the first set of pre-placed messages. For example, as a flow of outgoing messages for a destination is received by the communication enhancement module 108, all outgoing messages in the flow within a sliding window are compared against the first set of pre-placed messages. If there is a 1-to-1 correspondence between a subset of (e.g., all or a portion of) the messages in the window and the first set of pre-placed messages, that subset is considered to match the first set of pre-placed messages. If there is no 1-to-1 correspondence between any subset of messages in the window and the first set of pre-placed messages, the window can slide to include a new set of messages. When a window slides to capture a new set of messages, the new set of messages includes messages from the previous set of messages. The oldest messages are removed from the set as the window slides and newer messages are added to the set. Any suitable sliding window technique can be used. The size of the sliding window can be defined by a length of time and/or by a number of messages. If a message is removed from the window and has not been included in a matching set of messages, that message can be considered to not be part of a matching set of messages and can be forwarded on to the data terminal 204. In other examples, other methods can be used to identify a matching set of messages.

In an example, the communication enhancement module 108 can compare outgoing messages against multiple sets of pre-placed messages. For example, the communication enhancement module 106 in the UAV 102 can include multiple sets of pre-placed messages therein, and the communication enhancement module 108 in the MUCS 104 can correspondingly can compare outgoing messages therefrom to each of the multiple sets of pre-placed messages. Thus, the communication enhancement module 106 can identify if the outgoing messages match any of the multiple sets of pre-placed messages. As another example, the MUCS 104 can be communicating with multiple UAVs that each have a communication enhancement module installed therein, and each of the communication enhancement modules in the UAVs can have one or more sets of pre-placed messages therein. In such an example, the communication enhancement module 108 in the MUCS 104 can compare outgoing messages therefrom with all of the sets of pre-placed messages in all of the other communication enhancement modules to identify any matching sets.

In examples where the communication enhancement module 108 compares outgoing messages with multiple sets of pre-placed messages, the communication enhancement module 108 can use different parameters when comparing with different sets of pre-placed messages. For example, the window size used for comparing with a given set of pre-placed messages can correspond to the size of that set of pre-placed messages. Thus, if comparing against a larger set of pre-placed messages, the window size can be larger, if comparing against a smaller set of pre-placed messages, the window size can be smaller. In such an example, an outgoing message is not forwarded on to the data terminal 204 unless it is determined that the outgoing message is not in a matching set for any of the multiple sets of pre-placed messages being compared.

If a matching set of messages is identified, the communication enhancement module 108 can send an activation message in response to identifying a matching set of messages (block 306). The activation message is a message that corresponds to the set of pre-placed messages to which a match was identified. The activation message is sent from the communication enhancement module 108 to the data terminal 204 in place of the matching set of messages. Each set of pre-placed messages is assigned an activation message. Each activation message can conform to a protocol used by all the communication enhancement modules 106, 108 that are cooperating together to provide enhanced communications. The protocol used by the communication enhancement modules 106, 108 can have any suitable form. The data terminal 204 can receive the first activation message from the communication enhancement module 108 and transmit the first activation message to its destination.

In an example where the communication enhancement module 108 of the MUCS 108 identifies a matching set of messages to the first set of pre-placed messages, and the matching set of messages is destined for the UAV 102, the communication enhancement module 108 can generate a first activation message and send the first activation message to the data terminal 204. The first activation message is the activation message assigned to the first set of pre-placed messages and is sent from the communication enhancement module 108 to the data terminal 204 in response to identifying a set of messages that matches the first set of pre-placed messages. The first activation message is addressed to the destination of the matching set of messages, the UAV 102, which is also a location in which the first set of pre-placed messages is stored. The data terminal 204 can transmit the first activation message over the communication link 110 to the UAV 102. The data terminal 202 of the UAV 102 can then receive the first activation message and pass the first activation message to the communication enhancement module 106 of the UAV 102.

In response to receiving an activation message, a communication enhancement module (e.g., 106) of the destination communicating device can generate incoming messages for its main processing module (e.g., 206). The incoming message generated are the set of pre-placed messages that correspond to the activation message received. (block 308) The incoming messages are generated as though the incoming messages were generated by the communicating device (e.g., MUCS 104) that generated/sent the activation message. Thus, the incoming messages appear to the main processing module (e.g., 206) as though the incoming messages were generated and sent by the other communicating device, even though the incoming messages were actually generated by the communication enhancement module of the communicating device of that main processing module. The incoming messages are then sent to the main processing module of the destination communicating device for processing thereby (block 310).

In this example, the first activation message received by the data terminal 202 of the UAV 102 is forwarded to the communication enhancement module 106 of the UAV 102. The communication enhancement module 106 recognizes the first activation message and identifies that the first activation message corresponds to the first set of pre-placed messages. In response to receiving the first activation message, the communication enhancement module 106 generates a copy of the first set of pre-placed messages and sends the copy of the first set of pre-placed messages to the main processing module 206 of the UAV 102. The communication enhancement module 106 includes the MUCS 104 as the origination address of the copy of the first set of pre-placed messages. The main processing module 206 of the UAV 102 receives the copy of the first set of pre-placed messages and acts on the messages in the normal manner as if the copy of messages were generated and sent by the MUCS 104.

In this example, the outgoing messages from the main processing module 208 of the MUCS 104 and the copy of the first set of pre-placed messages provided to the main processing module 206 of the UAV 102 conform to the STANAG 4586 protocol. In examples where the main processing modules use a communication protocol other than STANAG 4586, the outgoing messages and the copy of the first set of pre-placed messages can conform to the other communication protocol.

The communication enhancement modules 106, 108 can each maintain a list of the sets of pre-placed messages and the messages that are in each set, as well as associations to indicate which activation message corresponds to each set of pre-placed messages. This list can be referenced to determine whether a set of messages matches a set of pre-placed messages and to identify which activation message corresponds to which set of pre-placed messages and vice versa.

In an example, the communication enhancement modules 106, 108 can operate on bi-directional communications concurrently. That is, the communication enhancement modules 106, 108 can perform the opposite functions as described above, for messages generated by the UAV 102 and destined for the MUCS 104. Thus, for outgoing messages generated by the main processing module 206 of the UAV 102, the communication enhancement module 106 can compare the outgoing messages against the set(s) of pre-placed messages in the MUCS 104 to identify any matching sets. If a matching set is identified, the communication enhancement module 106 can send the activation message assigned to that set of pre-placed messages to the data terminal 202 of the UAV 102 instead of the matching set of messages. The data terminal 202 of the UAV 102 can transmit the activation message over the communication link 110 to MUCS 104. The data terminal 204 of the MUCS 104 can receive the activation message and pass it to the communication enhancement module 108 of the MUCS 104. In response to receiving the activation message, the communication enhancement module 108 can generate the set of pre-placed messages to which the activation message is assigned and send the set of pre-placed messages to the main processing module 208 of the MUCS 104.

Using this technique of sending an activation message instead of the matching set of messages, and then generating a copy of the set of pre-placed messages at the destination device enables the communication enhancement modules 106, 108 to effectively transfer the matching set of messages to the destination in fewer bits. Thus, the bandwidth requirements to transfer the matching set of messages to the destination at the desired time are lower.

The set(s) of messages that are selected to be pre-placed messages can be selected in any suitable manner. For example, a set of messages that is transmitted frequently can be pre-placed to provide a large overall reduction in bits transmitted. As another example, a set of messages that is predicted to be transmitted during a time of severe bandwidth degradation can be pre-placed.

The pre-placed messages can be provided to the communication enhancement modules 106, 108 in any suitable manner. For example, a set of pre-placed messages can be included in the communication enhancement modules 106, 108 as originally built. A set of pre-placed messages can also be added in the field prior to deployment of the communicating enhancement module 106, 108. As another example, a set of pre-placed messages can be transmitted (e.g., over communication link 110) to the communication enhancement module 106, 108 in a communicating device after the communicating device 106, 108 is deployed. In any case, the set(s) of pre-placed messages can be stored on computer readable mediums of the communication enhancement modules 106, 108 for use thereby as described herein.

In an example, a set of pre-placed messages can include one or more dynamic fields. A dynamic field is a field within a message of the set of pre-placed messages in which data is not present. The data in a dynamic field is to-be-added by the destination communication enhancement module 106, 108 dynamically, during generation of a copy of that set of pre-placed messages. Accordingly, when generating a copy of a set of pre-placed messages at a destination communication enhancement module 106, 108, the destination communication enhancement module adds data, that is not present in the set of pre-placed messages, into the dynamic field(s) of that set of pre-placed messages. The data added into a dynamic field is based on information received from the origination communication enhancement module 106, 108 with the activation message. The original communication enhancement module 106, 108 is the communication enhancement module 106, 108 that generated the activation message. Dynamic fields allow a portion of the set of pre-placed messages to be different each time a copy of the set of pre-placed messages is generated by the destination communication enhancement module 106, 108.

The communication enhancement module 108 that identifies a matching set of messages to a set of pre-placed messages having one or more dynamic fields, extracts the information in the field(s) of the matching set of messages that correspond to the one or more dynamic fields (block 305). The extracted information is sent along with the activation message to the data terminal 204 for transmission to the destination. The data in a field that corresponds to a dynamic field is ignored when determining whether a set of messages matches with a set of pre-placed messages. That is, any data can be present in a field corresponding to a dynamic field—that data is not considered when identifying matching sets.

Once the dynamic field information is extracted from the matching set of messages, the matching set of messages can be discarded. If a matching set of messages has no corresponding dynamic fields, the matching set of messages can be discarded once the activation message is generated. The extracted information can be sent along with the activation message in any suitable manner including within the body of the activation message or in one or more additional messages. In response to receiving extracted information, a destination communication enhancement module 106, 108 can insert the extracted information into the locations of the dynamic fields when generating the copy of the corresponding set of pre-placed messages (block 309).

In the example described above where a matching set of messages is identified by the communication enhancement module 108 of the MUCS 104 to the first set of pre-placed messages, the communication enhancement module 108 can extract information from the field(s) of the matching set of messages that correspond to the dynamic field(s) of the first set of pre-placed messages. The communication enhancement module 108 can send the extracted information to the data terminal 204 along with the first activation message. The data terminal 204 can transmit the extracted information along with the first activation message over the communication link 110 to the UAV 102. The data terminal 202 of the UAV 102 passes the extracted information along with the first activation message to the communication enhancement module 106. The communication enhancement module 106 generates the copy of the first set of pre-placed messages that correspond to the activation message and inserts the extracted information into the corresponding dynamic field(s). The communication enhancement module 106 then sends the set of pre-placed messages with the extracted information inserted therein to the main processing module 206, which acts on the set of pre-placed messages with the extracted information therein as if the messages had been generated by the MUCS 108.

Using dynamic fields enables the majority of the information in a set of pre-placed messages to be discarded—reducing the number of bits transmitted, while also enabling some portions of the messages to be transmitted. Using dynamic fields may allow a set of pre-placed messages to cover more situations, because the set of pre-placed messages does not have to match the data in the dynamic fields, allowing a potentially larger number of messages to match the set of pre-placed messages. Using dynamic fields can also enable a set of messages to be pre-placed, even if all the data in each message is unknown at the time of pre-placement. A field having data that is unknown is set as a dynamic field by the communication enhancement modules 106, 108, and that data is extracted at the time of generation of the corresponding activation message as discussed above.

As mentioned above, each communication enhancement module 106, 108 can be a software-tool that is loaded onto the communicating device (e.g., UAV 102 or MUCS 104), or the communication enhancement module 106, 108 can be a hardware appliance with appropriate software that is installed in a communicating device. In any case, the communication enhancement module 106, 108 can be coupled or otherwise linked to the main processing module and the data terminal in its communicating device.

In addition to the communication enhancements described herein the communication enhancement modules 106, 108 can provide other communication enhancements including any of the communication enhancements described in co-pending U.S. patent application Ser. No. 15/916,000, titled "UAV COMMUNICATION ENHANCEMENT MODULE", which is hereby incorporated herein by reference.

Figure 4:
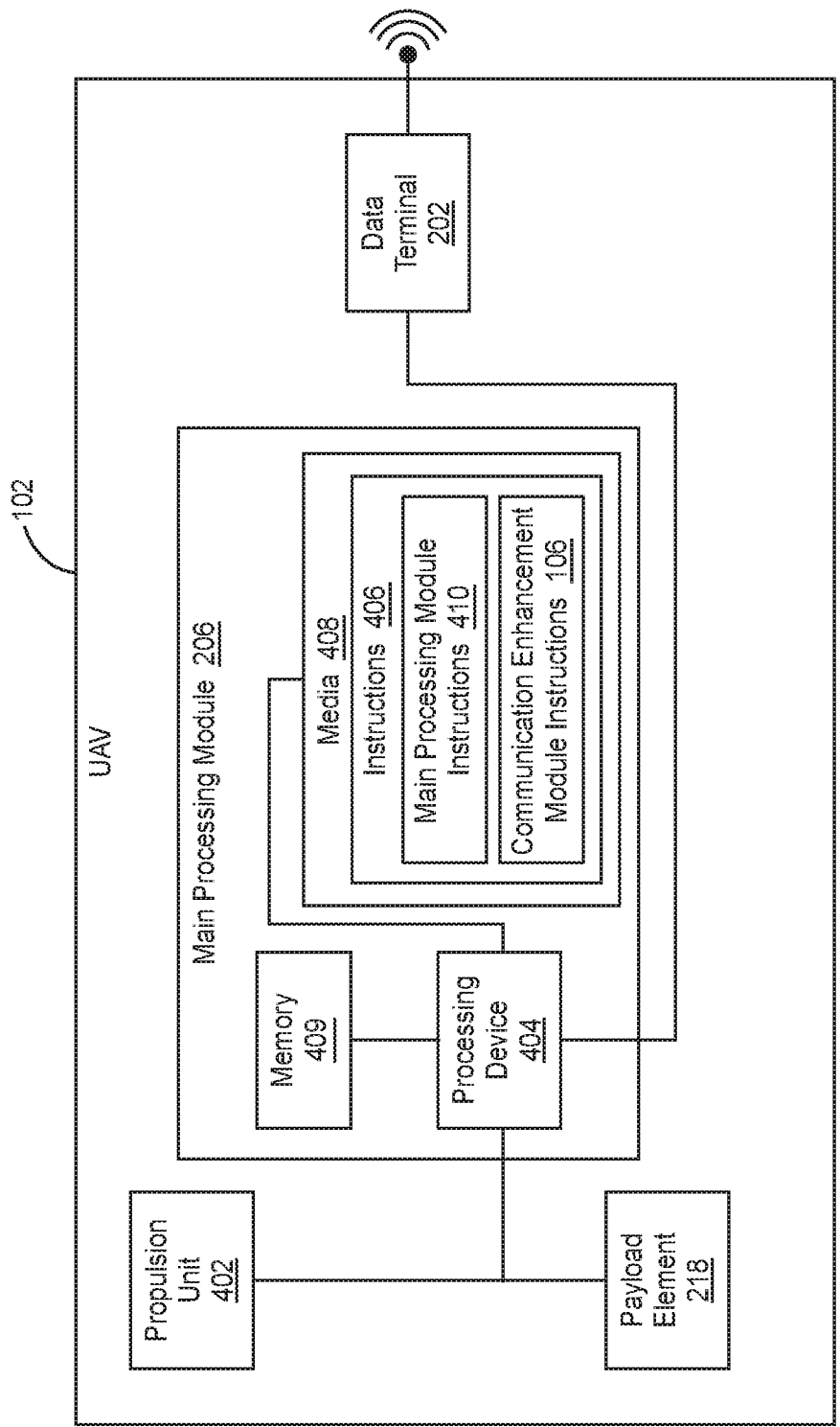
FIG. 4 is a block diagram of an example UAV having a software tool communication enhancement module therein.

FIG. 4 is a block diagram of an example UAV 102 that includes a communication enhancement module 106 that is a software tool. The UAV 102 includes a propulsion unit 402 to propel the UAV 102. Any appropriate propulsion unit 402 can be used including one or more electric motors or fuel engines and propellers, jet engines, and/or ducted fan.

The UAV 102 also includes a main processing module 206 that performs the general processing for the UAV 102. The main processing module 206 includes one or more processing devices 404 for executing instructions 406. The one or more processing devices 404 can include a general-purpose processor or a special purpose processor. The instructions 406 are stored (or otherwise embodied) on or in an appropriate storage medium or media 406 (such as flash or other non-volatile memory) from which the instructions 404 are readable by the processing device(s) 404 for execution thereby. The main processing module 206 also includes memory 409 that is coupled to the processing device(s) 404 for storing instructions (and related data) during execution by the processing device(s) 404. Memory 409 comprises, in one implementation, any suitable form of random access memory (RAM) now known or later developed, such as dynamic random-access memory (DRAM). In other implementations, other types of memory are used.

The instructions 406 include the main processing module instructions 410 which, when executed by the one or more processing devices 404, cause the one or more processing devices 404 to perform the actions of the main processing module 206 described herein. The instructions 406 also include the communication enhancement module 106 software tool loaded thereon. The communication enhancement module 106 includes instructions which, when executed by the one or more processing devices 404, cause the one or more processing devices 404 to perform the actions of the communication enhancement module 106 described herein. The instructions 406 also direct information to be passed between the communication enhancement module 106 and the main processing module 410 as described herein.

In an example, the communication enhancement module 106 or a portion thereof can be stored or otherwise embodied on a computer readable medium that is distinct from the UAV 102 and can be loaded onto the main processing module 206 to implement the communication enhancement module 106 thereon. The computer readable media on which the communication enhancement module 106 is stored can be any suitable computer readable media such as a magnetic media such as a hard disk drive (HDD), optical media such as a CD, DVD, Blu-Ray disk, or a non-volatile electric media such as a solid-state drive (SDD), flash media, or EEPROM. Such computer readable media can be standalone media (e.g., a USB stick or CD) or can be computer readable media within a computing device (e.g., a server or network accessible storage).

The main processing module 206 is coupled to the propulsion unit 402 to provide commands thereto and receive information from sensors thereof. The main processing module 206 is also coupled to a data terminal 202, which includes one or more wireless transceivers for transmitting and receiving wireless signals with the MUCS 104 as described herein. The UAV 102 can also include one or more payload elements 218 coupled to the main processing module 206 as described herein.

Figure 5:
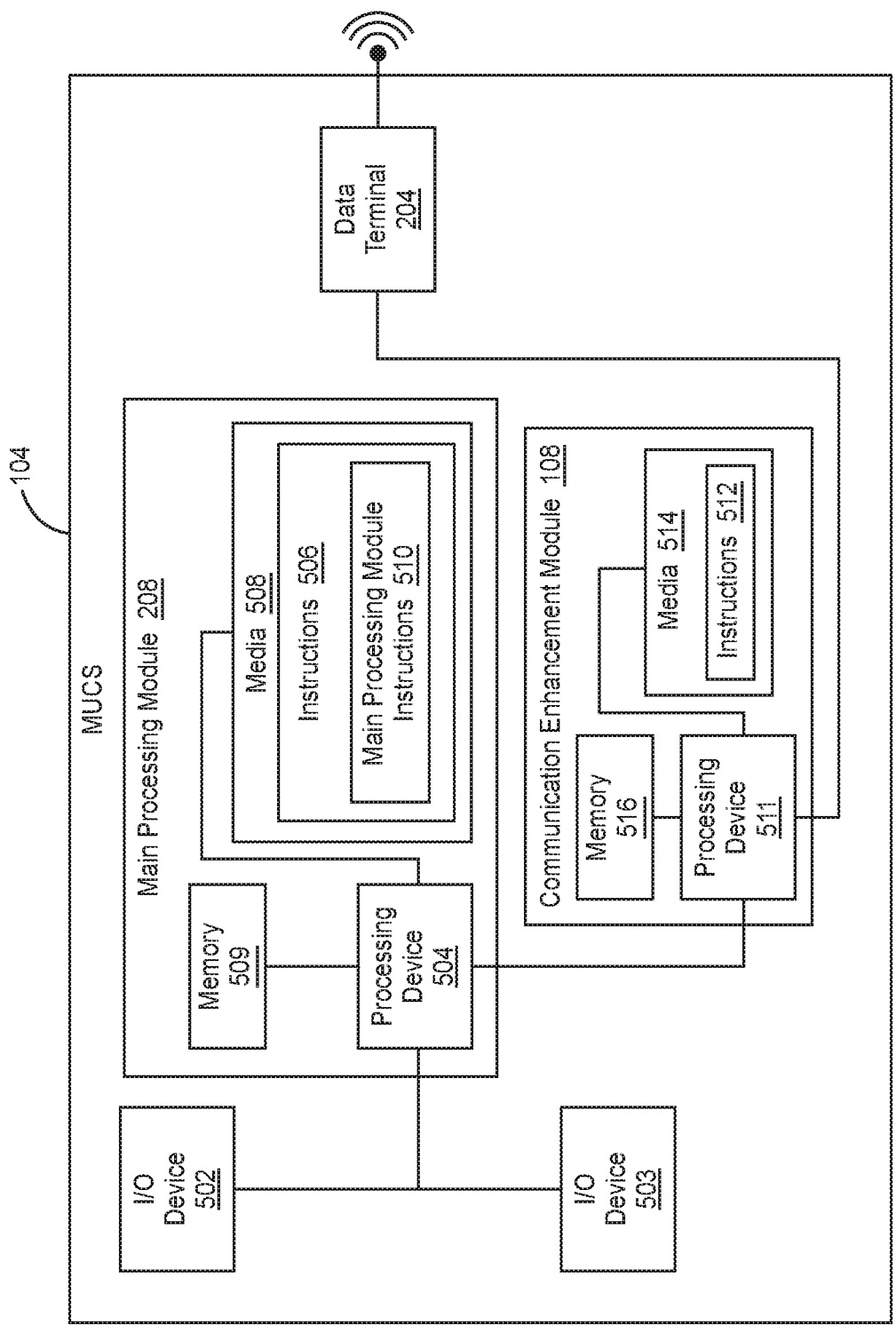
FIG. 5 is a block diagram of an example MUCS having a hardware appliance communication enhancement module therein.

FIG. 5 is a block diagram of an example MUCS 104 that includes a communication enhancement module 108 that is a hardware with software appliance, installed in the MUCS 104. The MUCS 104 can include a plurality of I/O devices 502, 503, such as a keyboard and a monitor, for receiving input from, or providing input to, a user. The MUCS 104 also includes a main processing module 208 that performs the general processing for the UAV 104. The main processing module 208 includes one or more processing devices 504 for executing instructions 506. The one or more processing devices 504 can include a general-purpose processor or a special purpose processor. The instructions 506 are stored (or otherwise embodied) on or in an appropriate storage medium or media 508 (such as flash or other non-volatile memory) from which the instructions 506 are readable by the processing device(s) 504 for execution thereby. The instructions 506 include the main processing module instructions 510 which, when executed by the one or more processing devices 504, cause the one or more processing devices 504 to perform the actions of the main processing module 208 described herein. The main processing module 208 also includes memory 509 that is coupled to the processing device(s) 504 for storing instructions (and related data) during execution by the processing device(s) 504. Memory 509 comprises, in one implementation, any suitable form of random access memory (RAM) now known or later developed, such as dynamic random-access memory (DRAM). In other implementations, other types of memory are used.

The main processing module 208 is coupled to the I/O devices 502, 503 to receive input therefrom and provide output thereto. The main processing module 208 is also coupled to the communication enhancement module 108, which is an appliance installed in the MUCS 104. The communication enhancement module 108 includes one or more processing devices 511, which are distinct from the one or more processing devices 504 of the main processing module 208. The one or more processing devices 511 can include a general-purpose processor or a special purpose processor. The communication enhancement module 108 also includes instructions 512, which are stored (or otherwise embodied) on or in an appropriate storage medium or media 514 (such as flash or other non-volatile memory) from which the instructions 512 are readable by the processing device(s) 511 for execution thereby. The instructions 514 include the instructions which, when executed by the one or more processing devices 511, cause the one or more processing devices 511 to perform the actions of the communication enhancement module 108 described herein. The communication enhancement module 108 also includes memory 516 that is coupled to the processing device(s) 511 for storing instructions (and related data) during execution by the processing device(s) 511. Memory 516 comprises, in one implementation, any suitable form of random access memory (RAM) now known or later developed, such as dynamic random-access memory (DRAM). In other implementations, other types of memory are used.

The communication enhancement module 108 is coupled to the data terminal 204, which includes one or more wireless transceivers for transmitting and receiving wireless signals with one or more UAVs 102 as described herein.

Although the example UAV 102 and MUCS 104 shown in FIGS. 4, 5 include a software tool and a hardware-with-software appliance respectively, these are merely examples. The communication enhancement module 106, 108 of a communicating device (e.g., UAV 102 or MUCS 104) can be either a software tool or a hardware with software appliance.

What is claimed is:

1. A communication enhancement module for a first communicating device, the communication enhancement module comprising:
 a computer readable medium having instructions thereon, the instructions, when executed by one or more processing devices, cause the one or more processing devices to:
  receive an activation message from a data terminal of the first communicating device, the activation message sent from a communication enhancement module of a second communicating device; and
  in response to receiving the activation message:
   identify a set of pre-placed messages stored on the computer readable medium to which the activation message is assigned;
   generate a set of messages corresponding to the set of pre-placed messages, wherein each message in the set of messages conforms to a communication protocol used by the second communicating device for messages sent to the first communicating device, wherein the set of messages indicate that the set of messages originated at the second communicating device; and
   send the set of messages to a main processing module of the first communicating device.

2. The communication enhancement module of claim 1, wherein the set of messages are received from the data terminal prior to the activation message and stored on the computer readable medium for later activation by the activation message.

3. The communication enhancement module of claim 1, wherein the set of messages are a sequence of commands for the communicating device.

4. The communication enhancement module of claim 1, wherein the communicating device is an unmanned aerial vehicle (UAV) and messages in the set of messages conform to a STANAG 4586 standard.

5. The communication enhancement module of claim 4, wherein the second communicating device is a multi-UAV control system (MUCS).

6. The communication enhancement module of claim 1, wherein the set of messages is a copy of the set of pre-placed messages.

7. The communication enhancement module of claim 1, wherein the instructions cause the one or more processing devices to:
 receive information corresponding to one or more dynamic fields in the set of pre-placed messages from the data terminal; and
 insert the information into locations corresponding to the one or more dynamic fields in the set of messages prior to sending the set of messages to the main processing module.

8. The communication enhancement module of claim 1, wherein the instructions cause the one or more processing devices to:
 receive a second activation message from the data terminal of the first communicating device, the second activation message sent from the communication enhancement module of the second communicating device, wherein the second activation message is different than the activation message; and
 in response to receiving the second activation message, send a second set of messages corresponding to the second activation message to the main processing element of the first communicating device, wherein each message of the second set of messages conforms to a communication protocol used by the second communicating device for messages sent to the first communicating device, wherein the second set of messages is different than the set of messages.

9. A method for enhancing communication, the method comprising:
 receiving, at a first communication enhancement module, an activation message from a data terminal of a first communicating device, the activation message sent from a second communication enhancement module of a second communicating device; and
 in response to receiving the activation message:
  identifying, at the first communication enhancement module, a set of pre-placed messages to which the activation message is assigned;
  generating, at the first communication enhancement module, a set of messages corresponding to the set of pre-placed messages, wherein each message in the set of messages conforms to a communication protocol used by the second communicating device for messages sent to the first communicating device, wherein the set of messages indicate that the set of messages originated at the second communicating device; and
  sending, from the first communication enhancement module, the set of messages to a main processing module of the first communicating device.

10. The method of claim 9, comprising:
 comparing, at the second communication enhancement module, outgoing messages generated by a main processing module of the second communicating device for transmission to the first communicating device with a representation of the set of pre-placed messages;
 in response to identifying a set of the outgoing messages that matches the set of pre-placed messages:
  generating, at the second communication enhancement module, the activation message;
  sending, from the second communication enhancement module, the activation message to a data terminal of the second communicating device, wherein the data terminal transmits the activation message to the first communicating device; and
  discarding, from the second communication enhancement module, the set of messages such that the set of messages are not transmitted to the first communicating device.

11. The method of claim 9, comprising:
 receiving, at the first communication enhancement module, the set of pre-placed messages prior to receiving the activation message: and
 storing the set of pre-placed messages for later activation by the activation message.

12. The method of claim 9, wherein generating the set of messages includes generating messages that conform to a STANAG 4586 standard.

13. The method of claim 9, wherein generating the set of messages includes generating a copy of the set of pre-placed messages.

14. The method of claim 9, comprising:
 receiving, at the first communication enhancement module, information corresponding to one or more dynamic fields in the set of pre-placed messages from the data terminal of the first communicating device; and inserting the information into locations corresponding to the one or more dynamic fields in the set of messages prior to sending the set of messages to the main processing module of the first communicating device.

\* \* \* \* \*